(12) United States Patent
Sivakumar et al.

(10) Patent No.: US 12,694,310 B2
(45) Date of Patent: Jul. 28, 2026

(54) URGENCY DRIVEN DYNAMIC EXPLAINABILITY

(71) Applicant: INTERNATIONAL BUSINESS MACHINES CORPORATION, Armonk, NY (US)

(72) Inventors: Gandhi Sivakumar, Bentleigh (AU); Kushal S. Patel, Pune (IN); Luke Peter Macura, Lucas (AU); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 17/550,401

(22) Filed: Dec. 14, 2021

(65) Prior Publication Data

US 2023/0186124 A1    Jun. 15, 2023

(51) Int. Cl.
| | |
|---|---|
| *G06F 16/20* | (2019.01) |
| *G06F 16/245* | (2019.01) |
| *G06F 16/2457* | (2019.01) |
| *G06F 40/40* | (2020.01) |
| *G06N 5/045* | (2023.01) |

(52) U.S. Cl.
CPC ........... *G06N 5/045* (2013.01); *G06F 16/245* (2019.01); *G06F 16/24575* (2019.01); *G06F 40/40* (2020.01)

(58) Field of Classification Search
None
See application file for complete search history.

(56) References Cited

U.S. PATENT DOCUMENTS

| | | | |
|---|---|---|---|
| 9,495,127 | B2 | 11/2016 | Ballinger et al. |
| 9,836,455 | B2 | 12/2017 | Martens et al. |
| 10,554,590 | B2 | 2/2020 | Cabrera-Cordon et al. |
| 10,885,759 | B1 * | 1/2021 | Lee .................... G08B 21/0446 |
| 11,443,164 | B2 * | 9/2022 | Dalli ...................... G06F 17/18 |
| 11,696,682 | B2 | 7/2023 | Tran |
| 2011/0153324 | A1 | 6/2011 | Ballinger et al. |
| 2011/0252011 | A1 * | 10/2011 | Morris .................... H04L 51/52 707/706 |
| 2014/0229164 | A1 * | 8/2014 | Martens ................ G06F 40/169 704/9 |
| 2018/0077088 | A1 * | 3/2018 | Cabrera-Cordon ......................... G06F 16/90335 |

(Continued)

FOREIGN PATENT DOCUMENTS

CN    103959283 A    7/2014

OTHER PUBLICATIONS

Mell et al., "The NIST Definition of Cloud Computing", NIST, Special Publication 800-145, Sep. 2011, 7 pages.

(Continued)

*Primary Examiner* — Belix M Ortiz Ditren
(74) *Attorney, Agent, or Firm* — Seed Intellectual Property Law Group LLP

(57) ABSTRACT

A computer-implemented method includes: receiving, by a computing device, a query from a user device; generating, by the computing device and using a machine learning model, an answer to the query; determining, by the computing device, an urgency level of the query; generating, by the computing device, an explanation of the answer based on the determined urgency level; and presenting, by the computing device, the answer and the explanation to a user via the user device.

17 Claims, 6 Drawing Sheets

(56)          References Cited

U.S. PATENT DOCUMENTS

| | | | | |
|---|---|---|---|---|
| 2019/0179860 | A1* | 6/2019 | Gizzi Giaimo | ........ G06Q 30/02 |
| 2020/0019871 | A1 | 1/2020 | Balakrishnan et al. | |
| 2020/0402658 | A1 | 12/2020 | Tomsett et al. | |
| 2023/0086791 | A1* | 3/2023 | Bierner | ............ G06F 16/24575 |
| | | | | 707/722 |

OTHER PUBLICATIONS

Alexey Ignatiev et al., "Abduction-Based Explanations for Machine Learning Models", https://ojs.aaai.org/index.php/AAAI/article/view/3964, Jul. 17, 2019, 10 pages.
Or Biran et al., "Human-Centric Justification of Machine Learning Predictions", Proceedings of the Twenty-Sixth International Joint Conference on Artificial Intelligence (IJCAI-17), Aug. 2017, 7 pages.
Unknown et al.,"Situation-aware explanation selection for machine learning systems", IP.com No. IPCOM000264916D, Feb. 5, 2021, 3 pages.
Tirthajyoti Sarkar, "Google's new 'Explainable AI (xAI) service", towards data science, https://towardsdatascience.com/googles-new-explainable-ai-xai-service-83a7bc823773, Nov. 25, 2019, 8 pages.
Unknown, "Recognize speech by using enhanced models", https://cloud.google.com/speech-to-text/docs/enhanced-models, downloaded Dec. 14, 2021, 2 pages.
Fan-Gang Zeng et al., "Speech recognition with amplitude and frequency modulations", PNAS, https://www.pnas.org/content/102/7/2293, Feb. 15, 2005, 6 pages.

* cited by examiner

500

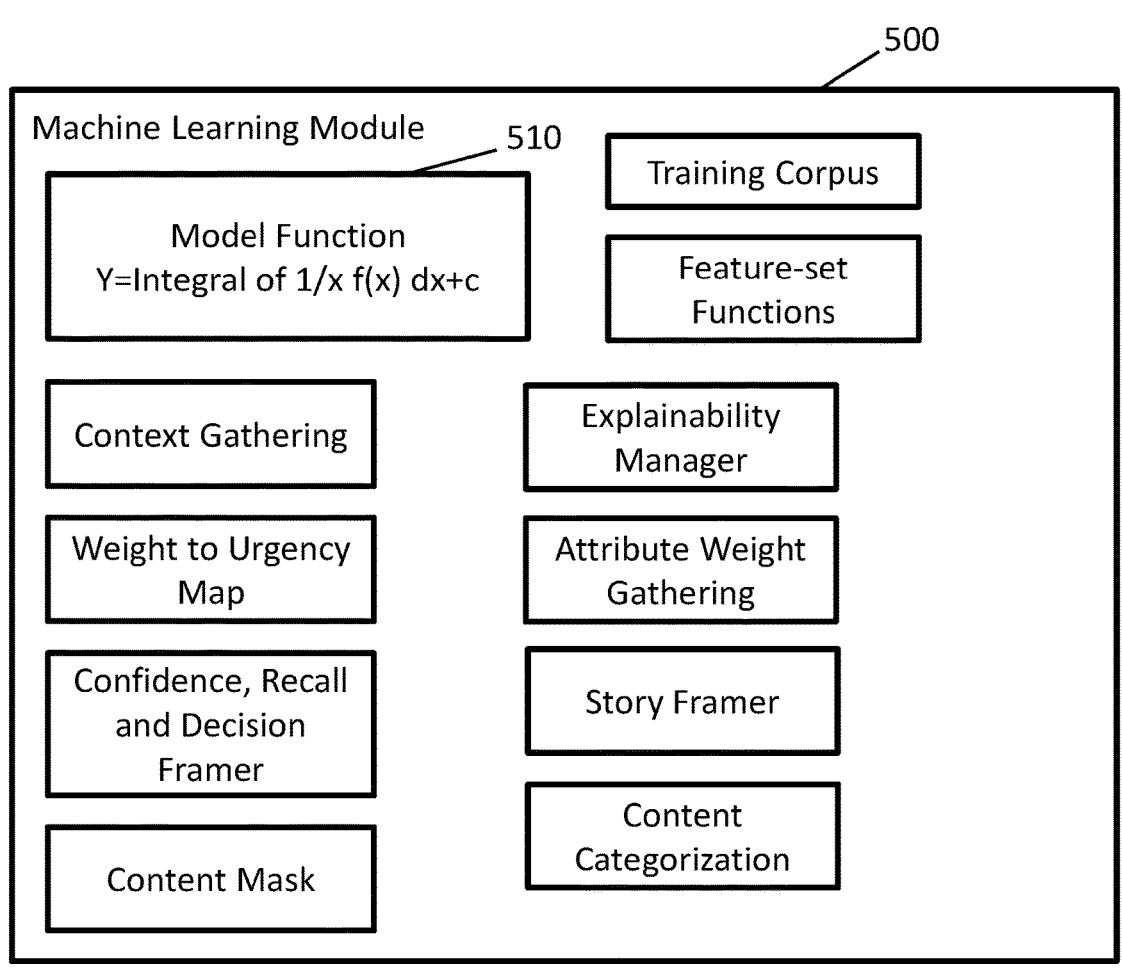

Machine Learning Module   510

Model Function
Y=Integral of 1/x f(x) dx+c

Training Corpus

Feature-set Functions

Context Gathering

Explainability Manager

Weight to Urgency Map

Attribute Weight Gathering

Confidence, Recall and Decision Framer

Story Framer

Content Mask

Content Categorization

| Urgency Level | Explanation Type | Explanation Policies |
|---|---|---|
| P0 | Extremely Urgent | Word level explanation, crisp, high weight |
| P1 | Very Urgent | Word level, high weight |
| P2 | Urgent | Moderate Weight, sense level explanation |
| ... | ... | ... |

FIG. 6

| Receive a query from a user via a user device | — 705 |

| Generate an answer to the query using a machine learning model | — 710 |

| Determine an urgency level of the query | — 715 |

| Generate an explanation of the answer based on the determined urgency level | — 720 |

| Present the answer and the explanation to the user via the user device | — 725 |

URGENCY DRIVEN DYNAMIC EXPLAINABILITY

BACKGROUND

Aspects of the present disclosure relate generally to explainable artificial intelligence and, more particularly, to explainability based on urgency in artificial intelligence.

Many industries are trending towards a cognitive era where machines are becoming intelligent. The machines not only serve humans in a smart way through intangible interfaces (cognitive devices which can communicate with humans in natural language) but also through tangible interfaces such as robots or other tangible interfaces. Cognitive interfaces possess super intelligence and have the ability to visualize things and should also be able to get the additional information from resources for more appropriate processing via cognition embodiment and communicating with other devices. Modern complex artificial intelligence (AI) techniques such as deep learning and genetic algorithms are naturally opaque. Such AI systems are actively dependent on a training corpus and learn from it to judge in a more natural way. This improves the AI system's performance over time based on more associated learning and history.

SUMMARY

In a first aspect of the disclosure, there is a computer-implemented method including: receiving, by a computing device, a query from a user device; generating, by the computing device and using a machine learning model, an answer to the query; determining, by the computing device, an urgency level of the query; generating, by the computing device, an explanation of the answer based on the determined urgency level; and presenting, by the computing device, the answer and the explanation to a user via the user device.

In another aspect of the disclosure, there is a computer program product including one or more computer readable storage media having program instructions collectively stored on the one or more computer readable storage media. The program instructions are executable to: receive a query from a user device; generate, using a machine learning model, an answer to the query; determine an urgency level of the query; generate, using explainable artificial intelligence, an explanation of the answer; determine, based on the determined urgency level, an amount of the explanation to include with the answer; and present the answer and the determined amount of the explanation to a user via the user device.

In another aspect of the disclosure, there is system including a processor, a computer readable memory, one or more computer readable storage media, and program instructions collectively stored on the one or more computer readable storage media. The program instructions are executable to: receive a query from a user device; generate, using a machine learning model, an answer to the query; determine an urgency level of the query; generate, using explainable artificial intelligence, an explanation of the answer; determine, based on the determined urgency level, an amount of the explanation to include with the answer; and present the answer and the determined amount of the explanation to a user via the user device.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

FIG. 5 shows a block diagram of an exemplary machine learning model in accordance with aspects of the disclosure.

FIG. 6 shows an urgency level chart in accordance with aspects of the disclosure.

DETAILED DESCRIPTION

Figure 1:
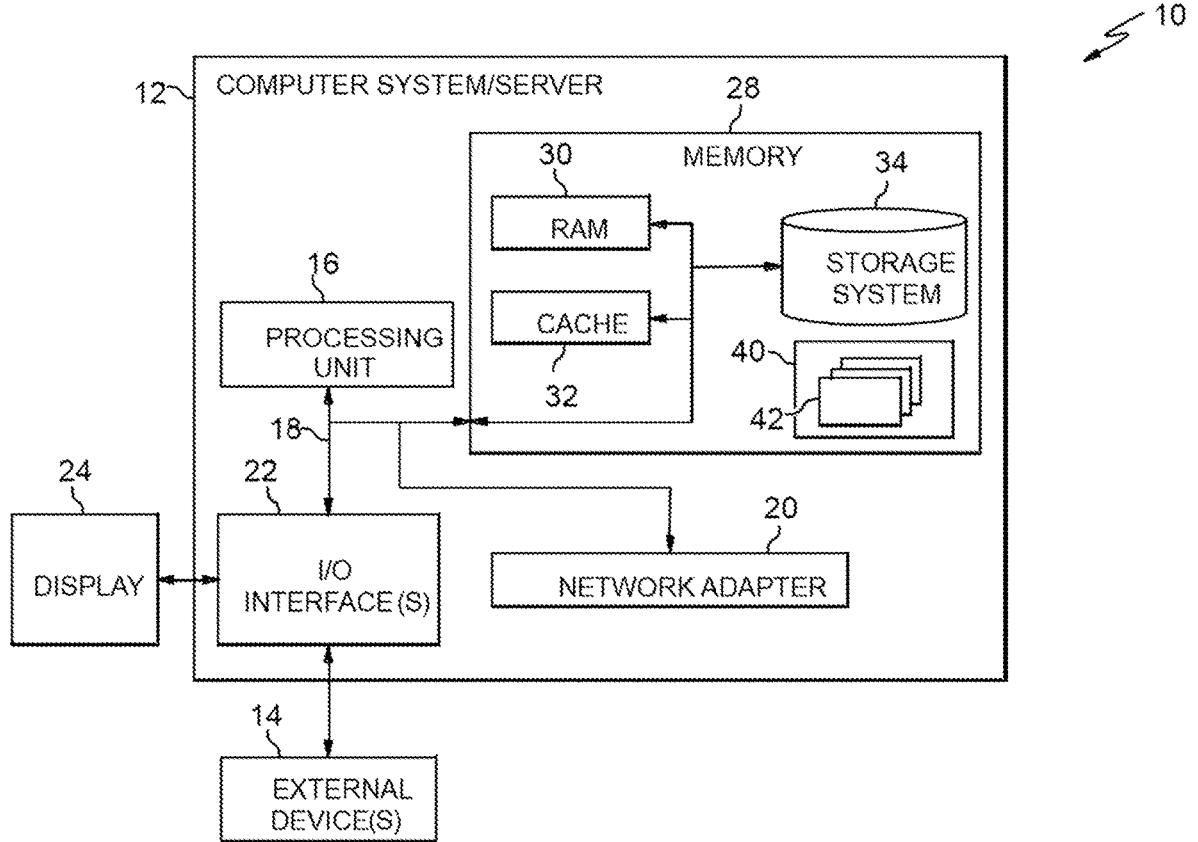
FIG. 1 depicts a cloud computing node according to an embodiment of the present disclosure.

Aspects of the present disclosure relate generally to explainable artificial intelligence and, more particularly, to explainability based on urgency in artificial intelligence. According to aspects of the disclosure, a conversion explainability service receives a decision and determines an urgency level of the decision. In embodiments, in response to the urgency level being a high urgency, the conversion explainability service delivers the decision with a low amount of (or no) explanation details regarding the decision. In embodiments, in response to the urgency level being a low urgency, the conversion explainability service delivers the decision with a higher amount of explanation details regarding the decision. In this manner, implementations of the disclosure increase efficiency by delivering an amount of explanation regarding the decision based on the urgency of the decision.

In embodiments, a method, system, or apparatus works with a cognitive interpretation or a visual interpretation system and collects information related to urgency of a query and accordingly instructs an explainable machine learning model (MLM) for urgency driven explanation of the MLM decisions. Embodiments comprise a mechanism which collects the information from external or internal cognitive interpretation with the sense of urgency of situational requirements and molds this urgency data into the explainability derivations of the machine learning models. When an urgent query is sent from upper layers of the cognitive system, and the MLM has made some decision for the input datasets and features attributes, embodiments running in the explainable MLM is invoked to get the realistic explanations based on imposed urgency levels. Embodiments collect the input characteristics attributes from the machine learning queries and the decisions along with other characteristics like distance, confidence and recall values which it then uses to formulate the explanations. In embodiments, this input data is mapped with the urgency requirements stated by the caller instance by a range-based system (example: Urgency P0 is highest while P10 is lower) and based on the level of urgency, and the explainable MLM decides and offers the level of explanation for a certain decision.

Embodiments of the disclosure provide improved efficiency in delivering explanation details with a decision based on the urgency of the decision. Such embodiments address the technical problem of reducing the use of computer resources and reducing the amount of irrelevant explanation details by limiting the collection and delivery of explanation details to those situations where explanation details are needed to properly make the decision.

It is to be understood that the aforementioned advantages, as well as other advantages described herein, are example advantages and should not be construed as limiting. Embodiments of the present disclosure can contain all, some, or none of the advantages while remaining within the spirit and scope of the present disclosure.

It should be understood that, to the extent implementations of the disclosure collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules

42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
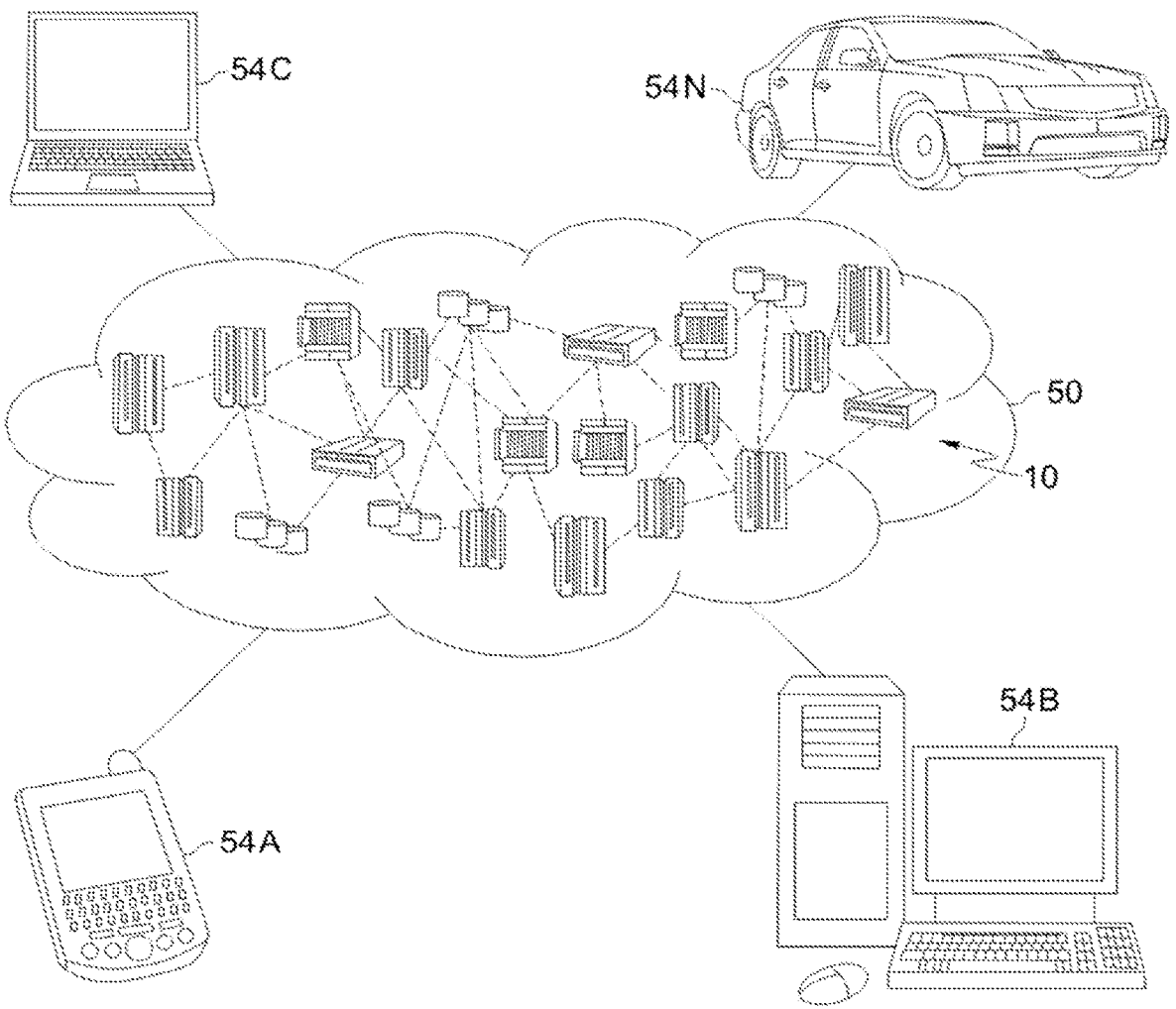
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
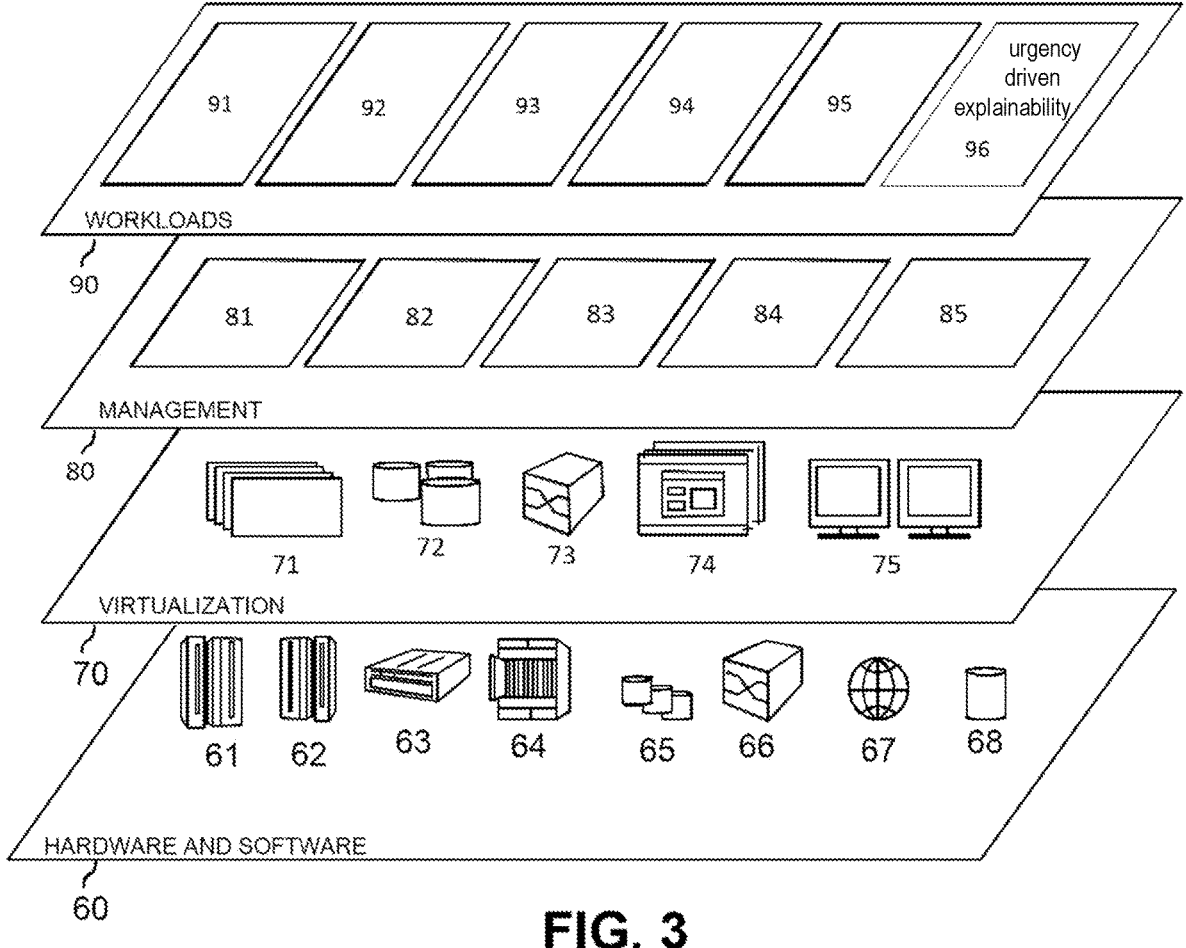
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and urgency driven explainability 96.

Implementations of the disclosure may include a computer system/server 12 of FIG. 1 in which one or more of the program modules 42 are configured to perform (or cause the computer system/server 12 to perform) one of more functions of the urgency driven explainability 96 of FIG. 3. For example, the one or more of the program modules 42 may be configured to: receive a decision; collect urgency data, the urgency data indicating an urgency of the decision; determine an urgency level of the decision based on the urgency data; in response to the urgency level being less than a highest urgency threshold, gather explanation details regarding an explanation of the decision; present the decision to a user; and in response to the urgency level being less than the highest urgency threshold, present a first portion of the explanation details to the user with the decision.

The term explainable AI (XAI) refers to methods and techniques in the application of AI technology such that the results of the solution can be understood by human experts. XAI contrasts with non-explainable AI, where machine learning models (MLM) cannot explain why the AI arrived at a specific decision. Hence, there is a need to justify the information and insights generated by an AI system. XAI models generate a large amount of metadata which gives the evidence and confidence level to end users that can be validated manually. Embodiments of the disclosure produce a score explaining how each factor contributed to the final result of the model predictions. Embodiments support a "Safe AI" concept by which humans can see what is being produced inside the AI MLM.

One of the significant limitations in some explainability based AI systems is the static nature of the examination that is offered, which is not received well by users. Some explainability algorithms offer the technical level explanation of the results of the machine learning model decision based on the available values and training corpus which is used by the machine learning models. Additionally, the explainability of these models has no conjunction with the upper level system from which the computation queries are invoked. Because of these limitations, the explanations of machine learning models are limited. As a simple example, a healthcare claims approval model computes (e.g., generates an output/prediction) whether the claims are to be approved or rejected based on the input characteristics of the attributes and the corpus information which is used while training the model. In such cases, the explainable model offers the results of <Approve/reject> along with a justification. The justification is usually the technical reasons why the claims got approved or rejected, such as, for example, objective parameters related to the patient. In the case of a multidimensional machine learning model, the justification becomes too complex and difficult to understand as there are many attributes and filters that contribute to the decision making in the model (e.g., to the generating the output/ prediction). The major limitation of explainable models missing dynamic response framing based on the nature of the enquiry is addressed by embodiments of this disclosure. In embodiments, the XAI model uses information about the context in which the decision is made (based on information from visual interpretation and/or a cognitive interpretation module) and tunes the response based on an urgency requirement.

Embodiments of the disclosure provide a method, system and apparatus that work with cognitive interpretation and/or visual interpretation systems and collect information regarding urgency, and accordingly instruct an explainable machine learning model (MLM) for urgency driven explanation of the MLM decisions. Embodiments comprise a mechanism by which the information from external or internal cognitive interpretation is collected with a sense of urgency of situational requirements. Embodiments combine this urgency data with the explainability derivations of the MLMs. When an urgent query is received from upper layers of a cognitive system, once the model has made some decision for the input datasets and features attributes, the process running in the explainable MLM is invoked to get more realistic explanations based on the imposed urgency levels. Embodiments collect the input characteristics attributes from the machine learning queries and the decisions along with other characteristics like distance, confidence and recall values, and then them to formulate the explanations. In embodiments, the input data is mapped with the urgency requirements stated by the requester by a range-based system (for example: an urgency of P0 is highest while P10 is lowest). Based on the level of urgency, the explainable MLM decides a level of explanation for a certain decision.

As an example: for a medical claim approval case, the cognitive integration instructs the user defined dynamic explainability (UDDE) tool about a critical patient health condition for which the claim application is submitted. The explainable MLM collects the attribute values and makes the decision regarding selection/rejection of the claim based on the defined mathematical model using a machine learning approach. Once the decision is made, the UDDE tool gathers the data about explainability context attributes (for example, age, medical history, etc.) which will be used in formulation of the explainability of the decision. In the case of the UDDE tool knowing that the patient's health is in critical condition and the query is marked as urgent, the UDDE tool makes short and concise explanations about the decisions made by the MLMs instead of giving a longer, more technical explanation. In this case, more detailed explanations are not needed because of the urgent nature of the decision. Current systems do not consider this urgency information when determining the explainability of the machine learning models. Embodiments generate better user consumable explanations as the MLMs are integrated with UDDE and possess much more peripheral knowledge of urgency. Additionally, embodiments integrate UDDE with other cognitive interfaces like vision recognition or voice recognition to get the dynamic urgency for explanations and frame the output accordingly. Embodiments use in-band or out-of-band protocol-based connections to get the device integration which makes the system more usable. Embodiments use natural language processing with the defined information inputs based on the nature of earnestness requirements to create the urgency influenced explanations. Accordingly, embodiments generate the dynamic explanations based on real time user requirements and, therefore, they are better consumed.

In embodiments, in a first operation, a conversion explainability service running in conjunction with an upper layer cognitive interpretation system (or a cloud situated instance) initiates itself, loads required data structures, and sends an initiation signal to peer services. In embodiments, the conversion explainability service loads a metadata cache and other pre-determined last instance information relevant to the metadata cache for further processing. In embodiments, the conversion explainability service loads the data structures, initiates linked lists and other information resources, and locates pointer locations for the incoming data.

In embodiments, in a second operation, the upper layer cognitive interpretation system includes business logic algorithms which the selected MLMs call to make decisions. In embodiments, these MLM decisions are used as a basis for performing further actions on the input queries (for example, a loan or insurance claim query). In embodiments, the cognitive explainability service provides the MLM with required input feature-sets and expects the output from MLM to include clarification data. In embodiments, the input feature-sets often include a set of real time attributes, and the output expectation is a decision or a value. In embodiments, based on the nature of the MLM, the MLM provides the output as a classification or a regression value.

In embodiments, in a third operation, the endpoint process at the cognitive abstraction layer (and/or visual interpretation system) initiates a data collection process that defines an urgency of the input query. In embodiments, as a result of the input job submission (query) being detected, the process captures the urgency requirement based on the nature of the input query. For example, in a case where the input query is a patient's claim case, then primary attributes of the claim are screened to determine an urgency level. In embodiments, the process generates an urgency level, and this information is sent to the UDDE tool for a next level of validation.

In embodiments, in a fourth operation, as a result of the query being received at the explainable MLM, the conversion explainability service decodes the metadata information to understand a type of the query. In embodiments, the conversion explainability service opens a web-socket based connection to exchange an input report and related object metadata for the respective job query. An example of a job query is to determine an appropriate level of explanation that should accompany a decision on a health insurance claim. In embodiments, as a result of the system authentication being performed, the web-socket is created, and the information exchange is started using in-band protocol data unit (PDU) based transfer. In embodiments, this metadata comprises explainability requirement details, urgency level, etc. In embodiments, the conversion explainability service also extracts feature set attributes and supplies them to the MLM mathematical model.

In embodiments, in a fifth operation, the conversion explainability service processes the query and provides the urgency with intermediate information which is used for determining the explanation to be given.

In embodiments, in a sixth operation, the conversion explainability service determines realistic explanations based on an imposed urgency level. In embodiments, the UDDE tool collects the input characteristics attributes from the machine learning query and the decision along with other characteristics like distance, confidence and recall values which it then uses to formulate the explanation. In embodiments, the conversion explainability service maps the input data with the urgency requirements stated by the caller instance by a range-oriented system. For example, an urgency level of P0 is highest while an urgency level of P10 is the lowest, and based on the level of urgency, the explainable MLM decides an appropriate level of explanation for a certain decision. In embodiments, an explainability manager performs a policy validation based on loaded user preferences and default policy matching.

In embodiments, in a seventh operation, as a result of the conversion explainability service making the explanation decision, the UDDE tool gathers the data about explainability content attributes (for example, age, medical history) which the conversion explainability service uses in formulation of the explanation of the decision. In embodiments, in a case where the UDDE tool indicates that the patient's health is in critical condition, and the conversion explainability service marks the query as urgent, and the conversion explainability service makes a concise, less detailed, explanation about the decision made by MLMs instead of making an explanation that includes more technical values and more details of confidence and recall values.

In embodiments, in an eighth operation, in a case of a high urgency value, the more detailed explanations are not required and, therefore, the UDDE tool's acquisition of urgency information is also not required.

An example of an application of embodiments of the disclosure is the explanation of a decision regarding a medical insurance claim. In this example, in a case of a high urgency value, the explanation is less detailed such as, for example: "The claim is APPROVED. The beneficiary has met all the required criteria for approval". In contrast, in this example, in a case of a low urgency value, the explanation is more detailed such as, for example: "The beneficiary was born in YYY. The beneficiary has paid their insurance premiums regularly. The beneficiary has ZZZ condition, which is covered in the policy. As a result, based on the above information, the claim amount can be processed by the insurance company for ZZZ condition. The confidence value of this claim query is 95% whereas the likelihood of recall is 5%. In this category of claim, the range of acceptable percentages is 85% to 100% for confidence and 0% to 15% for recall."

Figure 4:
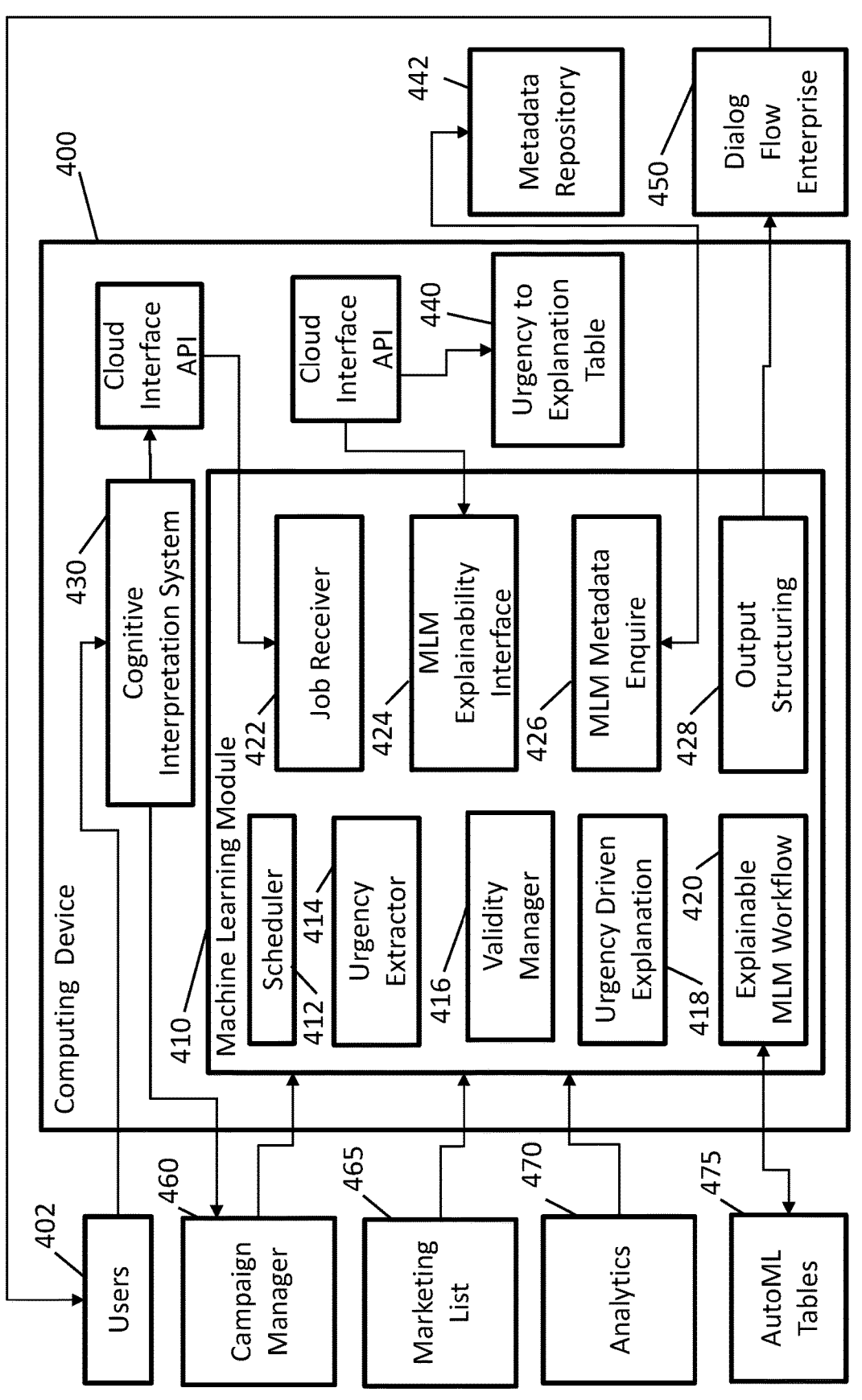
FIG. 4 shows a block diagram of an exemplary environment in accordance with aspects of the disclosure.

FIG. 4 shows a block diagram of an exemplary environment in accordance with aspects of the disclosure. In embodiments, the environment includes a computing device 400 that contains a plurality of modules, application programming interfaces (APIs), and tables. In the example shown in FIG. 4, computing device 400 includes a cognitive interpretation system 430 that is accessed by users utilizing a user device 402. In embodiments, user device 402 is a computing device such as a smartphone, laptop computer, desktop computer, or tablet computer, and may comprise one or more elements of computer system/server 12 of FIG. 1. In embodiments, a user utilizes user device 402 to input a query to be answered by the machine learning module 410 of the computing device 400. In one example, users input a query requesting approval of an insurance claim, although the system is not limited to this example and different types of queries can be accommodated in different implementations.

In accordance with aspects of the disclosure, cognitive interpretation system 430 performs cognitive analysis of the query and sends the query and analysis results to a campaign manager 460. The cognitive analysis may include one or more of: natural language processing of text included in the query; natural language processing of text transcript of audio included in the query; voice analysis of audio included in the query; and video analysis of video included in the query. In embodiments, urgency extractor 414 uses the results of one or more of these cognitive analysis technique to determine an urgency of the query. For example, different classifications of results of text analysis (e.g., detected sentiment, urgency, emotion, etc.) may be mapped to different levels of urgency. In another example, different classifications of results of voice analysis (e.g., detected tone, emotion, etc.) may be mapped to different levels of urgency. In another example, different classifications of results of video analysis (e.g., detected expressions, gestures, etc.) may be mapped to different levels of urgency. In embodiments, the user may also indicate a level of urgency of the query using predefined inputs provided in a user interface of the user device 402.

In accordance with aspects of the disclosure, campaign manager 460 forwards the query to a machine learning module (MLM) 410 for processing to determine an urgency of the query and a commensurate level of explanation. In this example, MLM 410 includes a scheduler 412 that schedules a job received by a job receiver 422 from, for example, a cloud interface API. In embodiments, an urgency extractor 414 extracts an urgency of the query from information received with the query and determines an urgency level of the query, e.g., using NLP. In embodiments, a validity manager 416 determines a validity of the query by, for example, checking insurance policy provisions and requirements. In embodiments, an urgency driven explanation module 418 determines an amount of explanation to be returned with a decision on the query. In embodiments, urgency driven explanation module 418 determines the amount of explanation based on the urgency of the query as determined by urgency extractor 414.

In embodiments, an explainable MLM workflow module 420 of MLM 410 interfaces with AutoML tables 475 to obtain tabular data used in the decision making. In embodiments, MLM 410 accesses, through MLM explainability interface 424, an urgency to explanation table 440 that stores historical data regarding types of queries (for example, health insurance claims) and their respective appropriate level of explanation. A cloud interface API may be used to provide the interface between MLM explainability interface 424 and urgency to explanation table 440. In embodiments, MLM 410 uses the data from urgency to explanation table 440 to determine the appropriate level of explanation for the current query. In embodiments MLM explanation interface 424 sends data (recently generated by MLM 410) regarding types of queries (for example, health insurance claims) and their respective appropriate level of explanation to urgency to explanation table 440 for future use.

In embodiments, MLM 410 includes an MLM metadata enquire module 426 that reads metadata from and writes metadata to a metadata repository 442 that is, in this example, remote from computing device 400. In embodiments, the metadata includes details of the explanations that are associated with particular queries. In embodiments, MLM 410 includes an output structuring module 428 that structures the output of MLM 410 in a format that can be understood by users 402. In embodiments, the output is a response to the query (for example, a decision regarding allowing or denying an insurance claim) and the appropriate amount of explanation based on the urgency of the query. In embodiments, the output from output structuring module

428 is received by a dialog flow enterprise 450 and forwarded to (or accessed by) users 402. FIG. 4 shows a marketing list 465 and analytics 470 as examples of data and/or resources accessed by MLM 410 and used by MLM 410 to determine the appropriate amount of explanation to include with a response to a particular query.

In embodiments, computing device 400 comprises machine learning module (MLM) 410 and cognitive interpretation system 430, each of which may comprise one or more program modules such as program modules 42 described with respect to FIG. 1. Computing device 400 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

FIG. 5 shows a block diagram of an alternate exemplary MLM 500 in accordance with aspects of the disclosure. In embodiments, computing device 400 includes MLM 500 in the place of MLM 410. In this example, FIG. 5 includes a MLM model function 510. The function shown in FIG. 5 represents one of many machine learning functions that can be used by MLM 500.

FIG. 6 shows an exemplary urgency level chart 600 that may be used by urgency extractor 414 of FIG. 4 in accordance with aspects of the disclosure. In embodiments, an urgency level of a query determined by urgency extractor 414 is classified as urgency level P0 if the query is extremely urgent. In this example, an urgency level of P1 is given to a query that is very urgent (less urgent than P0), and an urgency level of P2 is given to a query that is urgent (less urgent than P1). Chart 600 shows examples of explanation polies that apply to each urgency level. Embodiments include more urgency levels than those shown in FIG. 6. For example, embodiments, include urgency levels P0 through P10, where level P10 is the lowest level of urgency (and thus receives the highest amount of explanation).

In one example, the urgency extractor 414 of FIG. 4 uses first and second thresholds defined relative to the urgency levels P0 through P10 to classify urgency at different levels. For example, a first (high) threshold can be set at level P1 and a second (low) threshold can be set at level P7. In this example, decisions with urgency levels equal to or greater than the first (high) threshold are provided with a relatively low amount of explanation, decisions with urgency levels equal to or less than the second (low) threshold are provided with a relatively high amount of explanation, and decisions with urgency levels between the first (high) threshold and the second (low) threshold are provided with a relatively medium amount of explanation (where medium is an amount less than the relatively high amount and greater than the relatively low amount of explanation). In this manner, the system can compare determined urgency values to predefined thresholds to determine an amount of explanation to provide with a decision of the MLM. The urgency levels (P0-P10) and the thresholds described in this example are non-limiting and merely for illustrating aspects of the disclosure; and other implementations can use differently defined urgency levels and/or thresholds.

Figure 7:
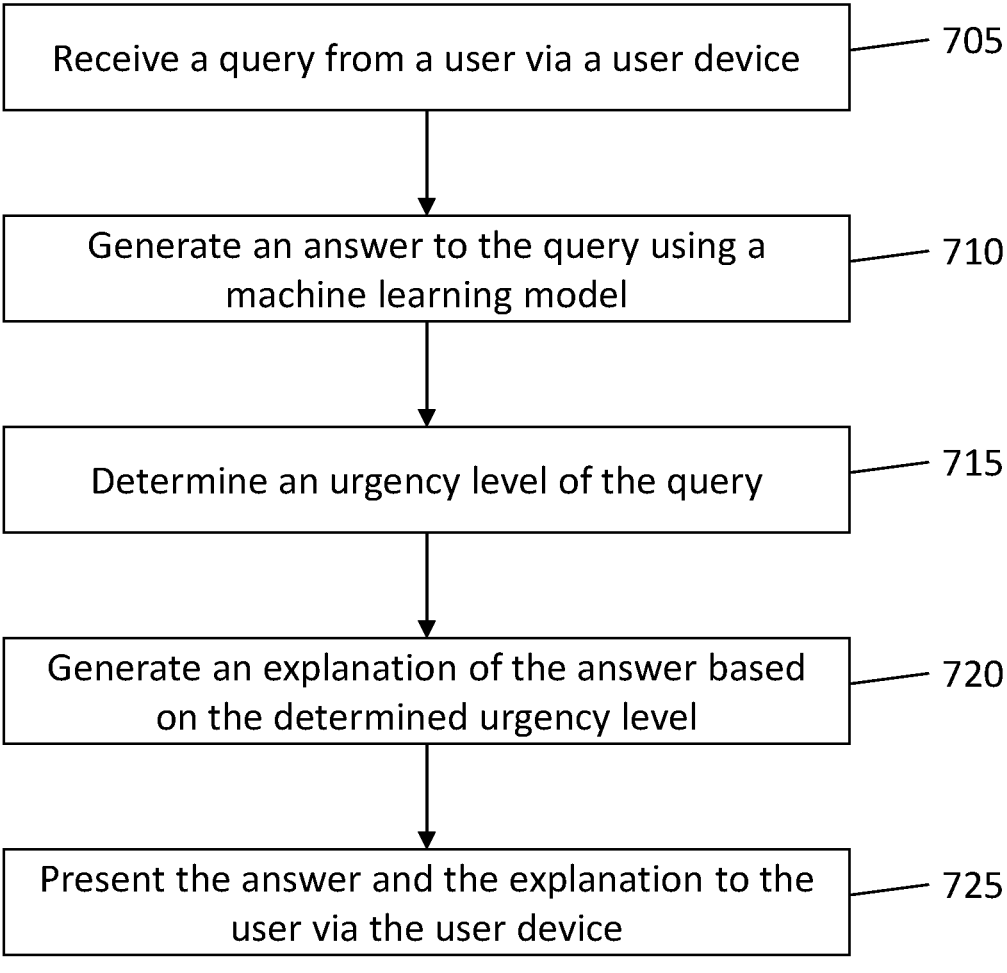
FIG. 7 shows a flowchart of an exemplary method in accordance with aspects of the disclosure.

FIG. 7 shows a flowchart of an exemplary method in accordance with aspects of the present disclosure. Operations of the method may be carried out in the environment of FIG. 4 and are described with reference to elements depicted in FIG. 4.

At operation 705, the system receives a query from a user via a user device. In embodiments, and as described with respect to FIG. 4, the computing device 400 receives a query from a user via user device 402. The user may input the query into the user device 402 via typing (e.g., text), speaking (e.g., audio), or camera (e.g., audio and video). The user may input a user-indicated level of urgency with the query, e.g., by selecting from predefined levels of urgency presented in a UI in which the user inputs the query.

At operation 710, the system generates an answer to the query using a machine learning model. In embodiments, and as described with respect to FIG. 4, the computing device 400 generates an answer to the query using a machine learning model embodied in machine learning module 410. In embodiments, the machine learning model comprises an explainable artificial intelligence (XAI) machine learning model that is configured to generate an answer to the query and an explanation of the answer, the explanation being in plain language that is understandable by humans.

At operation 715, the system determines an urgency level of the query. In embodiments, and as described with respect to FIG. 4, the urgency extractor 414 determines an urgency level of the query. The urgency level may be based on any one or more of: a user-indicated level of urgency included with the query; natural language processing of text included in the query; natural language processing of text transcript of audio included in the query; voice analysis of audio included in the query; and video analysis of video included in the query.

At operation 720, the system generates an explanation of the answer based on the determined urgency level. In embodiments, and as described with respect to FIG. 4, the machine learning module 410 generates an explanation for the answer using XAI techniques, and the urgency driven explanation module 418 determines an amount of the explanation to include with the answer based on the urgency level determined by urgency extractor 414. In embodiments, the generating the explanation comprises comparing the determined urgency level to a threshold value and determining an amount of the explanation to include with the answer based on the comparing. In one example, the generating the explanation comprises: in response to the determined urgency level being less than the threshold value, generating the explanation to have relatively less information explaining the answer; and in response to the determined urgency level being greater than the threshold value, generating the explanation to have relatively more information explaining the answer. In this manner, embodiments provide different amounts of the explanation based on the determined urgency level of the query.

At operation 725, the system presents the answer and the explanation to a user via the user device. In embodiments, and as described with respect to FIG. 4, the computing device 400 transmits the answer and the explanation to the user device 402 for display to the user via a user interface.

In embodiments, a service provider could offer to perform the processes described herein. In this case, the service provider can create, maintain, deploy, support, etc., the computer infrastructure that performs the operation steps of the disclosure for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the disclosure provides a computer-implemented method, via a network. In this case, a computer infrastructure, such as computer system/server 12 (FIG. 1), can be provided and one or more systems for performing the processes of the disclosure can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a computing device, a query from a user device;
   generating, by the computing device and using a machine learning model, an answer to the query;
   determining, by the computing device, an urgency level of the query;
   collecting, by the computing device, input characteristics attributes from the query which include distance, confidence, and recall values;
   determining, based on the determined urgency level, an amount of an explanation to include with the answer;
   generating, by the computing device, the explanation of the answer based on the determined urgency level and the input characteristics attributes; and
   presenting, by the computing device, the answer and the explanation to a user via the user device, wherein the machine learning model comprises an explainable artificial intelligence machine learning model which generates metadata including evidence and a confidence level for validation,
   wherein the generating the explanation comprises generating the explanation using explainable artificial intelligence.

2. The method of claim 1, wherein the determining the amount of the explanation comprises:
   comparing the determined urgency level to a threshold value;
   in response to the determined urgency level being less than the threshold value, determining a relatively greater amount of the explanation to include with the answer; and
   in response to the determined urgency level being greater than the threshold value, determining a relatively lesser amount of the explanation to include with the answer.

3. The method of claim 1, wherein the urgency level is determined by applying natural language processing to text of the query.

4. The method of claim 1, wherein the urgency level is determined based on user-indicated level of urgency included with the query.

5. The method of claim 1, wherein the urgency level is determined based on video analysis of the query.

6. The method of claim 1, wherein the urgency level is determined based on voice analysis of the query.

7. A computer program product comprising one or more computer readable storage media having program instructions collectively stored on the one or more computer readable storage media, the program instructions executable to:

receive a query from a user device;

generate, using a machine learning model, an answer to the query;

determine an urgency level of the query;

collect input characteristics attributes from the query which include distance, confidence, and recall values;

generate, using explainable artificial intelligence, an explanation of the answer based on the input characteristics attributes;

determine, based on the determined urgency level, an amount of the explanation to include with the answer; and present the answer and the determined amount of the explanation to a user via the user device, wherein the machine learning model comprises an explainable artificial intelligence machine learning model which generates metadata including evidence and a confidence level for validation.

8. The computer program product of claim 7, wherein the determining the amount of the explanation to include with the answer comprises comparing the determined urgency level to a threshold value.

9. The computer program product of claim 8, wherein the determining the amount of the explanation comprises:

in response to the determined urgency level being less than the threshold value, determining a relatively greater amount of the explanation to include with the answer; and in response to the determined urgency level being greater than the threshold value, determining a relatively lesser amount of the explanation to include with the answer.

10. The computer program product of claim 7, wherein the urgency level is determined by applying natural language processing to text of the query.

11. The computer program product of claim 7, wherein the urgency level is determined based on user-indicated level of urgency included with the query.

12. The computer program product of claim 7, wherein the urgency level is determined based on video analysis of the query.

13. The computer program product of claim 7, wherein the urgency level is determined based on voice analysis of the query.

14. A system comprising: a processor, one or more computer readable storage media, and program instructions collectively stored on the one or more computer readable storage media, the program instructions executable to:

receive a query from a user device;

generate, using a machine learning model, an answer to the query;

determine an urgency level of the query by applying natural language processing to text of the query;

collect input characteristics attributes from the query which include distance, confidence, and recall values;

generate, using explainable artificial intelligence, an explanation of the answer based on the input characteristics attributes;

determine, based on the determined urgency level, an amount of the explanation to include with the answer by comparing the determined urgency level to a threshold value;

in response to the determined urgency level being less than the threshold value, determining a relatively greater amount of the explanation to include with the answer;

in response to the determined urgency level being greater than the threshold value, determining a relatively lesser amount of the explanation to include with the answer; and present the answer and the determined amount of the explanation to a user via the user device, wherein the machine learning model comprises an explainable artificial intelligence machine learning model which generates metadata including evidence and a confidence level for validation.

15. The system of claim 14, wherein the urgency level is also determined based on user-indicated level of urgency included with the query.

16. The system of claim 14, wherein the urgency level is also determined based on one of voice analysis and video analysis of the query.

17. The method of claim 1, wherein the explainable artificial intelligence machine learning model generates a score which includes how each factor contributes to a final result of model predictions, the generation of the explanation of the answer is further based on a real time user requirement, the determining, based on the determined urgency level, the amount of the explanation to include with the answer comprises comparing the determined urgency level to a first high threshold value and a second low threshold value which is lower than the first threshold value, in response to the determined urgency level being equal to or less than the second low threshold value, determining a relatively greater amount of the explanation to include with the answer, in response to the determined urgency level being equal to or greater than the first high threshold value, determine a relatively lesser amount of the explanation to include with the answer, and in response to the determined urgency level being between the first high threshold value and the second low threshold value, determining a relatively medium amount of the explanation to include with the answer.

\* \* \* \* \*